United States Patent Office 2,718,338
Patented Sept. 20, 1955

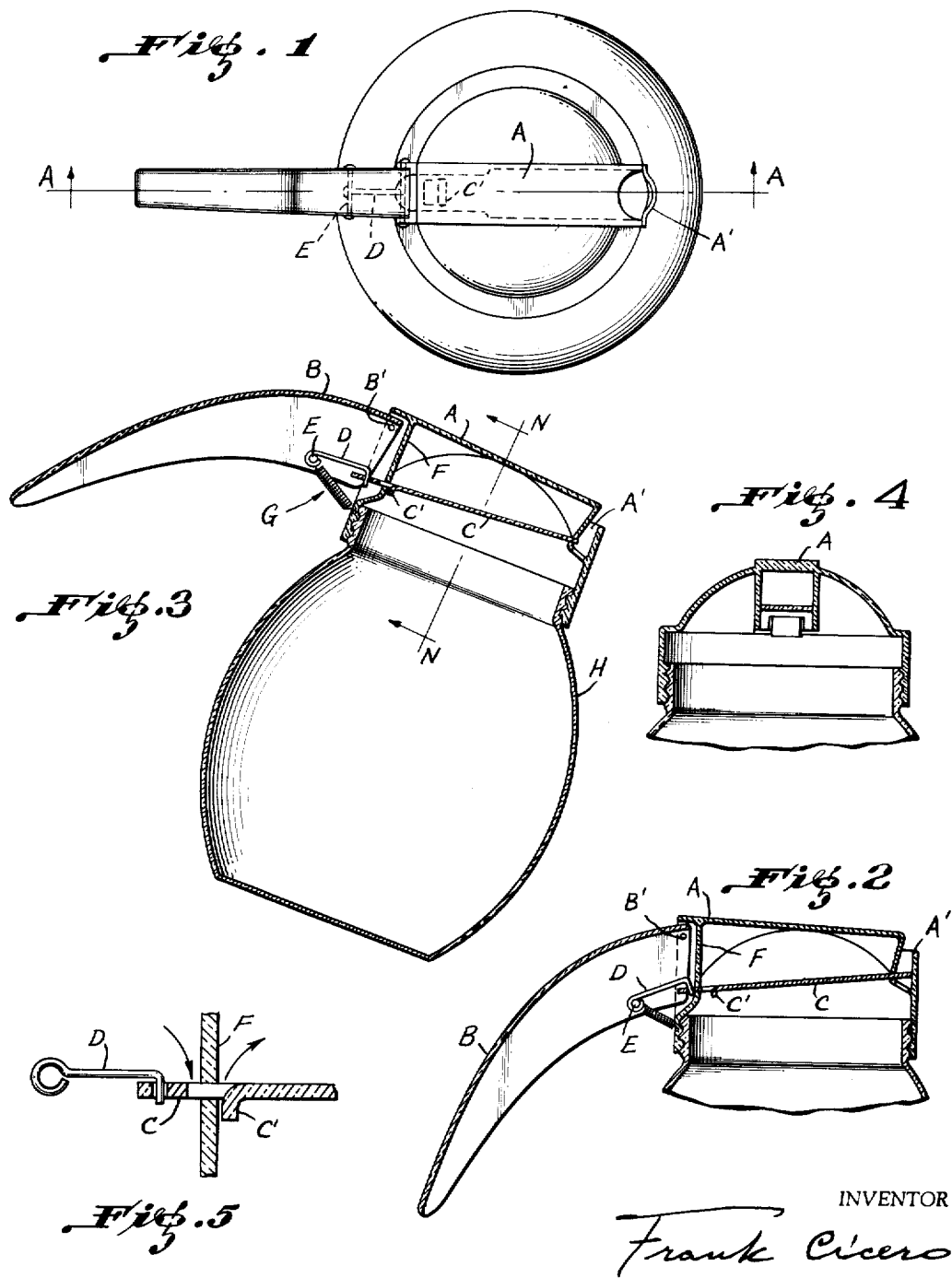

2,718,338
DISPENSING CONTAINER HAVING A HANDLE-OPERATED CLOSURE

Frank Cicero, Los Angeles County, Calif.

Application August 5, 1950, Serial No. 177,883

8 Claims. (Cl. 222—469)

This invention relates to container closure caps and more particularly to removable, plastic or cast metal closure caps of the type used on containers such as of milk, cream, syrups and other liquids and having a so-called drip cut blade operable to control the opening of the spout and a handle whereby the container may be held and tilted. It is the main object of this invention to provide an improved design of a dispensing closure by which to let the liquid within the container flow through the spout when wanting to serve oneself, the dripcut blade automatically controlling the spout; the handle being pivotably attached to the upper rim of the cap, the blade having one end inserted through an aperture on a wall of the cap and being connected by means therefor to the handle at a point under said pivoting point.

By the use of this improved closure cap one only has to tilt the container by the handle and, in response to this motion, the drip cut blade or drip cut means will automatically be caused to move backwardly to open the spout of the container to permit flow of liquid therefrom; said blade being provided with a stop lip that abuts against the wall of the cap. And when the container is not tilted by the handle and rests upright, the weight of the latter will cause the drip cut blade to be moved forwardly to close the aperture of the spout.

A related object is to provide a concurrent breathing aperture whereby the liquid within the untilted container is closed to air and to insects; the stop lip being stamped out from the blade and leaving a gap or aperture which coincides with the aperture of the wall when the container is tilted by the handle; said concurrent aperture preventing gurgling of the liquid when it flows through the spout.

Referring to the drawings of my improved closure:

Fig. 1 is the plan view of the cap as shown in normal position;

Fig. 2 is the sectional elevation view in normal position;

Fig. 3 is the section elevation view taken on lines A—A of Fig. 1, however it particularly shows the handle in tilted or pivoted position;

Fig. 4 is the section view taken on line N—N of Fig. 2.

Referring in detail to the drawings, A is the closure cap formed as shown by an upright annular wall closed by a top; A' is the spout of the cap and is formed by a tube contiguous to the wall of the cap; B is the handle; B' is a hinge or location where the handle is pivotably disposed on the closure cap; C is the drip cut blade; C' is stamped out or turned down lip of the blade C to serve as stop means thereof; D is a connection member; E is a strut means or holder, which may be molded as a rib, carried by the handle for the member D; F is an enclosure wall or a channel-like portion of the annular wall of the closure cap and is provided with an aperture wherethrough one end of the drip cut C slides and whereby its lip C' limits the latter's backward travel; H is a container shown screwed onto the closure cap. F also serves as a support for handle B and wherein one end of the handle B is pivotably attached.

Since the handle B is hinged or likely disposed onto the closure cap A at the upper end of the respective enclosure wall F, an arc or space is obtained right under the pivoting point inbetween the handle and the enclosure wall when the container H is tilted by the handle. This arc-like motion will cause to slide back the drip cut blade C, since this is jointed to the connection member D which in turn is connected to the handle by way of the strut E carried by the handle suitably below the pivoting point. The stop lip C' is formed by stamping process and leaves a gap or aperture on the blade C. The lip should be turned downwardly at 45°, the gap being positioned between the enclosure wall and the lip in order that when the container is tilted by the handle the dripcut blade is slidden back and the gap is positioned right through or across the aperture of the wall F to form the temporary or concurrent breathing aperture whereby the liquid in the container may flow through the spout without gurgling. The handle's weight itself will cause the shut off of the spout and of the breathing aperture when the container is not picked up for use and stands upright on the table; however a light duty spring G may be disposed for pulling the handle toward the wall of the cap to help the drip cut blade to close the spout. And it is noted that, should said spring or a sticky syrup interfere with the pivoting of the handle, the container may be readily pushed away with a finger or two of the hand holding the handle. While I have herein shown my closure cap as embodied in a preferred form of construction, by way of example, it will be apparent that further alterations or modifications might be made in the construction without departing from the spirit of the invention.

Consequently, without limiting myself in this respect, I claim as my invention:

1. In a dispensing container closure having a cap, an annular wall and a top: a tubular spout provided within the cap and contiguous to the annular wall; an enclosure wall opposite the spout and forming a channel of a portion of the annular wall; a handle for the cap having one end pivotably disposed in the upper end of said channel; said channel being provided with an aperture on the lower portion thereof and said tubular spout also being provided with an aperture; a dripcut blade disposed slideable through said apertures for controlling the access of the spout; means connecting the handle to the blade; and stop means provided on the blade to limit the sliding of the same, the pivoting of the handle effecting operation of the blade.

2. In a dispensing container closure having a cap, an annular wall, a top and a spout: an enclosure wall opposite the spout and forming an upright channel on the annular wall; a handle for the cap having one end pivotably disposed in the upper end of said channel, said channel being provided with a dual-purpose aperture on the lower portion thereof; and a dripcut blade normally closing the spout and disposed automatically slideable through said aperture to control the spout, this being provided on the annular wall, connection means joining the lower portion of the handle adjacent the cap to the blade and stop means on the blade engageable by the channel being provided, said stop means, being a stamped or pressed down lip of the blade forming an aperture on said blade, for providing a concurrent breather means, air access existing only when said two apertures coincide when the container is tilted by the handle when pouring liquid from the container through the spout.

3. A dispensing container closure as defined in claim 1 and said blade being provided with an aperture thereon for providing a concurrent breather means, air access existing only when said apertures of the channel and of the blade coincide when the container is tilted by the handle for pouring liquid from the container through the spout.

4. A device as defined in claim 1 and including: a spring means having one end connected to the handle and the other to the wall of the cap for aiding to keep the handle unpivoted when the container rests.

5. In a dispensing container closure: a wall of the closure and having a first aperture a dipcut blade of the closure having a second aperture, one end of the blade being inserted through the first aperture and slideable therethrough by means therefor, the second aperture normally being positioned at the interior of the wall, sliding backwardly or pulling the blade by said end causing the other end of the blade to open a spout of the closure and simultaneously causing the aperture of the blade to coincide with the aperture of the wall and thus effecting a concurrent breathing aperture.

6. A device as defined in claim 5 and in which the second aperture is provided by stamping or pressing a stop lip on the blade.

7. A device as defined in claim 5 and including a spring means disposed abutting against said wall operatively to return said blade to the forward position to close said spout.

8. In a dispensing container closure having a cap, an annular wall, a top and a spout: a handle for the cap having one end pivotably disposed on the upper portion of the cap, said wall being provided with a dual-purpose aperture on the lower portion thereof; and a dripcut blade normally closing the spout and disposed automatically slidable through said aperture to control the spout, this being provided on the annular wall, connection means joining the lower portion of the handle adjacent the cap to the blade and stop means on the blade engageable by the wall being provided, said stop means, being a stamped or pressed down lip of the blade, forming an aperture on said blade for providing a concurrent breather means, air access existing only when said two apertures coincide when the container is tilted by the handle when pouring liquid from the container through the spout.

References Cited in the file of this patent

UNITED STATES PATENTS

| | | |
|---|---|---|
| 2,102,349 | Baron | Dec. 14, 1937 |
| 2,169,239 | Hacmac | Aug. 15, 1939 |
| 2,251,164 | Pershall | July 29, 1941 |
| 2,294,594 | Bloomfield | Sept. 1, 1942 |

UNITED STATES PATENT OFFICE
CERTIFICATE OF CORRECTION

Patent No. 2,718,338                                      September 20, 1955

Frank Cicero

It is hereby certified that error appears in the printed specification of the above numbered patent requiring correction and that the said Letters Patent should read as corrected below.

Column 1, lines 18 and 19, for "so-called drip cut" read -- liquid shearing or flow stopping --; line 24, for "dripcut" read -- liquid shearing --; line 32, for "drip cut", both occurrences, read -- liquid shearing --; lines 38 and 62, for "drip cut", each occurrence, read -- liquid shearing --; line 70, for "drip cut" read -- liquid shearing blade --; column 2, line 8, for "drip cut" read -- liquid shearing --; line 16, for "dripcut" read -- liquid shearing --; lines 25 and 26, for "drip cut" read -- liquid shearing --; lines 45 and 57, for "dripcut", each occurrence, read -- liquid shearing --; column 3, line 9, after "closure" strike out "and"; same line, after "aperture" insert -- and --; same line 9, for "dipcut" read -- liquid shearing --; Column 4, line 5, for "dripcut" read -- liquid shearing --.

Signed and sealed this 12th day of August 1958.

(SEAL)
Attest:

KARL H. AXLINE
Attesting Officer

ROBERT C. WATSON
Commissioner of Patents